United States Patent
Chen et al.

(10) Patent No.: US 12,090,821 B1
(45) Date of Patent: Sep. 17, 2024

(54) SYSTEMS WITH ADJUSTABLE WINDOW TRANSMISSION

(71) Applicant: Apple Inc., Cupertino, CA (US)

(72) Inventors: Yuan Chen, Campbell, CA (US); Falu Yang, Chengdu (CN); Haiqing Xianyu, Cupertino, CA (US); Peter F. Masschelein, Campbell, CA (US); Sang Un Choi, San Jose, CA (US); Xiaokai Li, Mountain View, CA (US); Yunseok Lee, Santa Clara, CA (US); Zhibing Ge, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/364,209

(22) Filed: Jun. 30, 2021

Related U.S. Application Data

(60) Provisional application No. 63/061,058, filed on Aug. 4, 2020.

(51) Int. Cl.
| | | |
|---|---|---|
| *G02F 1/1334* | (2006.01) | |
| *B60J 3/04* | (2006.01) | |
| *E06B 9/24* | (2006.01) | |
| *G02F 1/1337* | (2006.01) | |

(52) U.S. Cl.
CPC .............. *B60J 3/04* (2013.01); *E06B 9/24* (2013.01); *G02F 1/1334* (2013.01); *G02F 1/133711* (2013.01); *E06B 2009/2464* (2013.01)

(58) Field of Classification Search
CPC ............. G02F 1/133711; G02F 1/1334; G02F 1/0147; E06B 9/24; E06B 2009/2464; E06B 3/30; E06B 2009/2417; B60J 3/04; F21S 41/645; F21S 41/153; F21S 41/255; F21S 41/143
See application file for complete search history.

(56) References Cited

U.S. PATENT DOCUMENTS

| | | | |
|---|---|---|---|
| 6,055,088 A | 4/2000 | Fix et al. | |
| 6,459,533 B1 * | 10/2002 | Clapp | G02F 1/1326 359/260 |
| 7,754,295 B2 * | 7/2010 | Chari | G02F 1/1334 252/299.6 |
| 8,199,264 B2 * | 6/2012 | Veerasamy | B32B 17/10788 349/86 |
| 8,941,788 B2 | 1/2015 | Brecht et al. | |
| 9,365,161 B2 | 6/2016 | Mannheim Astete et al. | |

(Continued)

*Primary Examiner* — Mariam Qureshi
(74) *Attorney, Agent, or Firm* — Treyz Law Group, P.C.; Kendall P. Woodruff

(57) ABSTRACT

A system such as a vehicle, building, or electronic device system may have a support structure with one or more windows. The support structure and window may separate an interior region within the system from a surrounding exterior region. Control circuitry may receive input such as user input and may adjust an adjustable layer in the window based on the input. The adjustable layer may be an adjustable light transmission layer. The adjustable light transmission layer may have a polymer matrix layer with embedded guest-host liquid crystal cells. Each cell may have liquid crystal material and dichroic dye. The adjustable light transmission layer may be operated in a dark state to prevent light from passing through the window, a clear state in which the window passes light, and intermediate states that exhibit intermediate light transmission levels.

22 Claims, 3 Drawing Sheets

(56) References Cited

U.S. PATENT DOCUMENTS

| | | | |
|---|---|---|---|
| 10,190,363 B2 | 1/2019 | Behmke et al. | |
| 2006/0244873 A1* | 11/2006 | Nakamura | G02F 1/139 |
| | | | 349/33 |
| 2008/0003379 A1* | 1/2008 | Chari | C09K 19/544 |
| | | | 252/299.1 |
| 2019/0203121 A1* | 7/2019 | Eo | C09K 19/544 |
| 2019/0241811 A1* | 8/2019 | Kirsch | E06B 9/24 |
| 2020/0278566 A1* | 9/2020 | Yoshida | B60J 3/06 |
| 2021/0206241 A1* | 7/2021 | Guo | B60J 1/20 |

* cited by examiner

US 12,090,821 B1

SYSTEMS WITH ADJUSTABLE WINDOW TRANSMISSION

This application claims the benefit of provisional patent application No. 63/061,058, filed Aug. 4, 2020, which is hereby incorporated by reference herein in its entirety.

FIELD

This relates generally to structures that pass light, and, more particularly, to windows.

BACKGROUND

Windows such as vehicle windows sometimes include glass layers. To enhance privacy or block sunlight, windows may sometimes be tinted.

SUMMARY

A system such as a vehicle, building, or electronic device system may have a support structure with one or more windows. The support structure and window may separate an interior region within the system from a surrounding exterior region. Control circuitry and input-output devices may be mounted within the support structure.

During operation, the control circuitry may use the input-output circuitry to receive input. The input may be, for example, user input such as input from a vehicle occupant.

Based on the input, the control circuitry may adjust an alternating-current drive signal or other control signal for an adjustable light transmission layer in the window. The adjustments to the drive signal may be used to adjust the amount of light transmission exhibited by the adjustable light transmission layer. The adjustable light transmission layer may be operated in a dark state to prevent light from passing through the window, a clear state in which the window passes light, and intermediate light transmission levels in which some light is passed and some light is blocked.

The adjustable light transmission layer may have a polymer matrix layer with embedded guest-host liquid crystal cells. Each cell may have liquid crystal material and dichroic dye. Transparent electrodes in the adjustable light transmission layer may be supported by respective transparent substrate layers. Structural glass layers or other window structures may be used to support the adjustable light transmission layer. If desired, the layers forming a window such as the structural glass layers and the layers forming the adjustable light transmission layer may have curved cross-sectional profiles.

DETAILED DESCRIPTION

A system may have windows. The windows may include electrically adjustable components such as adjustable light transmission components, which may sometimes be referred to as adjustable transmission layers, adjustable tint layers, adjustable light-transmission window layers, adjustable light transmission layers, or adjustable light absorbers. Systems that that may be provided with windows having electrically adjustable light transmission layers may include buildings, vehicles, electronic devices systems (e.g., head-mounted devices such as glasses with adjustable transmission lenses), and other suitable systems. Illustrative configurations in which systems with adjustable light transmission windows are vehicles may sometimes be described herein as an example. This is merely illustrative. Adjustable transmission window structures may be formed in any suitable systems.

An electrically adjustable light transmission layer may be formed using a polymer layer (sometimes referred to as a matrix or polymer matrix) in which numerous cells of guest-host liquid crystal material have been dispersed. Each cell may include liquid crystal material and dichroic dye (e.g., anisotropic guest dye molecules). The dye molecules align with liquid crystals in the liquid crystal material. Transparent electrodes may be used to adjust the electric field through the polymer layer. This allows the alignment state of the liquid crystals and guest dye to be adjusted and therefore allows the light transmission of the adjustable light transmission layer to be adjusted.

Figure 1:
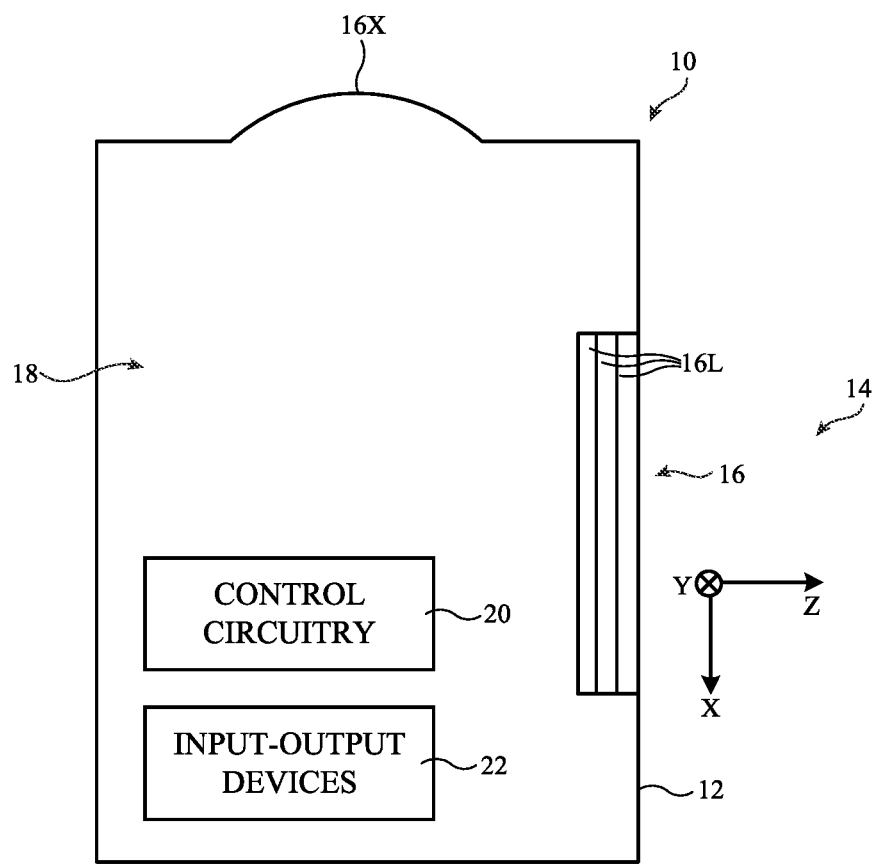
FIG. 1 is a schematic diagram of an illustrative system in accordance with an embodiment.

An illustrative system of the type that may include adjustable light transmission windows is shown in FIG. 1. As shown in FIG. 1, system 10 may have a support structure such as support structure 12 that supports one or more windows such as window 16. Support structure 12 and window 16 separate interior region 18 from exterior region 14. During at least some operating modes, window 16 may be transparent to allow occupants of system 10 who are located within interior region 18 to view objects located in exterior region 14 through window 16.

Structure 12 may form walls of a building, a vehicle body, an electronic device housing (e.g., a frame for a pair of glasses) or other supporting structures. In arrangements in which structure 12 forms a vehicle body, structure 12 may include a chassis to which wheels, propulsion systems, steering systems, and other vehicle systems are mounted and may include doors, trunk structures, a hood, side body panels, a roof, and/or other body structures.

System 10 may include control circuitry 20 and input-output devices 22. Input-output devices 22 may include sensors (e.g., touch sensors, a microphone, buttons, etc.), audio components, displays, and other components for providing output to an occupant of system 10, for making measurements of the environment surrounding vehicle 10, and for gathering input from an occupant of system 10. Control circuitry 20 may include storage and processing circuitry such as volatile and non-volatile memory, microprocessors, application-specific integrated circuits, digital signal processors, microcontroller, and other circuitry for controlling the operation of system 10. In scenarios in which system 10 is a vehicle, control circuitry 20 may control the components of the vehicle based on user input and other input from input-output device 22 (e.g., to adjust the vehicle's steering, brakes, throttle, and other controls associated with driving the vehicle and/or to adjust window transparency for window 16 and/or other settings associated with operations other than driving the vehicle). If desired, system 10 may be an autonomously driven vehicle. Window settings such as window transparency may be adjusted using voice comments, button input, touch screen input on a control panel or a touch sensitive window area, and/or other input (e.g., vehicle occupant input).

As shown in FIG. 1, window 16 may include multiple window layers 16L. Window layers 16L may include layers of transparent material such as transparent layers of glass, transparent layers of polymer, transparent semiconductor layers (e.g., transparent indium tin oxide layers or other transparent conductive layers), transparent polymer layers, and/or other transparent layers. These layers may include rigid and/or flexible materials. In some configurations, layers 16L and window 16 are flat. In other configurations, some or all of window 16 is curved. As an example, illustrative window 16X of FIG. 1 may have a curved cross-sectional profile and may optionally exhibit areas with compound curvature (e.g., areas where window 16X has non-developable surfaces). Illustrative arrangements in which window 16 has a planar shape may sometimes be described herein as an example.

Window layers 16L may include one or more adjustable light transmission layers. Layers 16L may also include one or more structural layers. As an example, window layers 16L may include multiple structural glass layers. In some configurations, these layers may include an inner transparent structural layer (sometimes referred to as an inner glass layer) and an outer transparent structural layer (sometimes referred to as an outer glass layer). Optional additional layers may be included. The inner and outer layers of the window and/or other layers 16L may include adjacent layers that are separated by an air gap and/or may include adjacent layers that are spaced apart by a gap that is filled with polymer, liquid, other dielectric, layers forming an adjustable light transmission device, etc. As an example, layers 16L may include an outer window layer, an inner window layer, and an adjustable light transmission layer sandwiched between the outer layer without air gaps.

Layers 16L (e.g., inner and/or outer structural glass layers surrounding an adjustable light transmission layer) may include single-layer glass layers (e.g., single layers of tempered glass) or, in some configurations, may include multi-layer structures formed, for example, from first and second glass layers that are laminated together. A laminated glass layer may have a polymer such as polyvinyl butyral (PVB) or a layer of another polymer that joins first and second glass layers to form a sheet of laminated glass. Multi-layer glass structures (laminated glass layers formed from two or more laminated glass layers with interposed PVB) and single-layer glass layers may include optional tinting (e.g., dye, pigment, etc.). Polymer layers in laminated glass layers (e.g., PVB layers) may also optionally be tinted.

Figure 2:
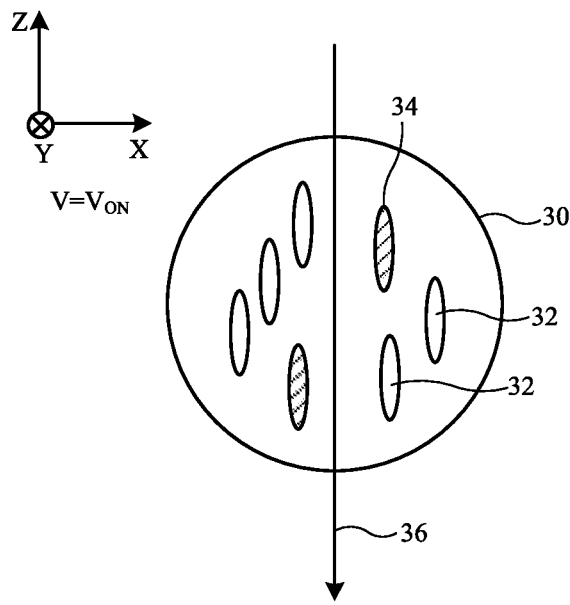
FIGS. 2 and 3 are cross-sectional side views of an illustrative guest-host liquid crystal cell in an adjustable transmission window layer in accordance with an embodiment.

Adjustable light transmission may be provided using electrically adjustable guest-host liquid crystal material. To help avoid undesirable uniformity issues such as gravity-induced mura as well as undesired pressure sensitivity, the guest-host liquid crystal material may be formed in nano-sized cells such as the illustrative cells of FIGS. 2 and 3. Guest-host cells 30 of FIGS. 2 and 3 may be spheres that are formed within a polymer matrix. The spheres may be filled with liquid crystals 32 (the "host") and anisotropic dye molecules 34 (the "guest").

Cells 30 may have diameters of less than 200 nm, less than 150 nm, or other small size to help reduce light scattering. The liquid crystal material preferably exhibits a low birefringence (e.g., less than 0.12, less than 0.08, or other suitable value). The refractive index of the polymer matrix may be matched to that of cells 32 (e.g., the refractive index of the liquid crystal material in cells 30 when cells 30 are in their transparent state) to help avoid undesired haze when the adjustable layer is transparent (e.g., a haze of less than 5%). Index matching may be achieved by ensuring that the refractive indices of the polymer matrix and cells 30 (in the transparent cell state) differs by less than 0.15, less than 0.1, less than 0.05, less than 0.02, or other suitably low amount.

The clearing temperature of the liquid crystal material of cells 30 is preferably at least 100° C., which allows window 16 to be operated at relatively high temperatures (e.g., 60° C. or 70 °C). Cells 30 may use either a nematic liquid crystal mode or a cholesteric liquid crystal mode. To help introduce helical twisting in the cholesteric liquid crystal mode, chiral dopant may be added to cells 30. The presence of chiral dopant in cells 30 may help make cells 30 exhibit more uniform light absorption for different polarization states of transmitted light when using a cholesteric liquid crystal arrangement.

Figure 3:
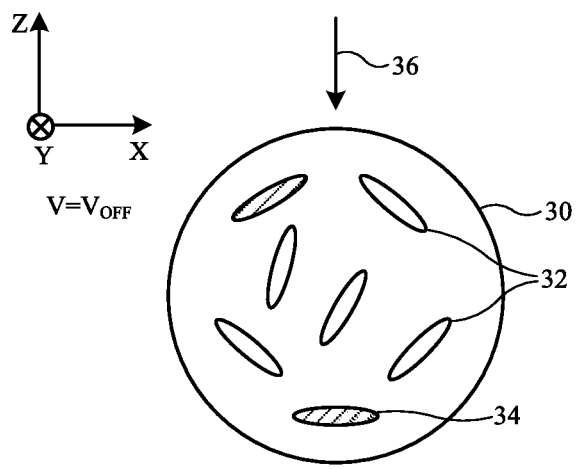

There is typically more liquid crystal material in cells 30 than dye material (e.g., the dye may make up about 2-3% of cells 30). The orientation of liquid crystals 32 can be adjusted by adjusting the electric field applied to liquid crystals 32. The orientation of dye molecules 34 tracks that of liquid crystals 32. The light transmission exhibited by cells 30 (and therefore the transmission of adjustable transmission layer 16L formed from cells 30) is medium to high (e.g., at least 30%, at least 40% at least 50%, at least 60% at least 75%, at least 85%, at least 90%, etc.) when a control signal (e.g., an alternating-current drive signal VON) is applied so that liquid crystals 32 and dye molecules 34 are aligned in a first state (e.g., parallel to the direction of incoming light rays such as illustrative light ray 36 in the example of FIG. 2) and this light transmission is low (e.g., less than 15%, less than 10%, less than 5%, 0%, etc.) when the control signal (e.g., an alternating-current drive signal VOFF) is applied so that liquid crystals 32 and dye molecules 34 are aligned in a second state (e.g., when liquid crystals 32 and dye molecules 34 are oriented randomly and are not aligned parallel to light ray 36, as shown in the example of FIG. 3). The medium to high transmission state, which may sometimes be referred to as a clear state, may be characterized by low haze (e.g., less than 5%). The low transmission state, which may sometimes be referred to as a dark state, may be used to block exterior sunlight and to provide vehicle occupants with privacy by blocking interior region 18 from view from exterior region 14.

Any suitable drive signal may be used in adjusting the transmission of cells 30. In an illustrative configuration, alternating-current (AC) drive signals are used (e.g., square wave signals or other AC signals). The frequency of the AC drive signals may be at least 1 Hz, at least 10 Hz, at least 40 Hz, less than 480 Hz, less than 100 Hz, 10-100 Hz, or other suitable frequency. The peak-to-peak voltage of the drive signal (e.g., the voltage applied from one surface of the adjustable transmission layer to the other by a pair of transparent electrodes) may be at least 10 V, at least 20 V, less than 60 V, less than 40 V, 10-60 V, etc. (e.g., when placing cells 30 in a clear state). The peak-to-peak voltage may be different (e.g., 0V, less than 1 V, less than 0.5 V, etc.) when operating cells 30 in an opaque (dark) mode. The drive signal can be adjusted by control circuitry 20 based on user input (e.g., user input directing control circuitry 20 to make window 16 opaque, clear, or to exhibit an intermediate level of light transmission). If desired, the drive voltage can be ramped up or down no faster than a minimum predetermined ramp time. This minimum time period for changing the drive voltage between its clear mode and dark mode states may have, for example, a value of 10 ms, a value of 10 ms to 100 ms, or other suitable value to help avoid transient haze issues that are associated with the amount of time required for helical liquid crystal structures in cells 30 to unwind or reform when changing their alignment.

An adjustable light transmission layer may be formed by creating a layer of polymer matrix material that includes embedded guest-host liquid crystal cells 30 sandwiched between a pair of opposing conductive electrodes. Optional substrate layers may be used to help support the polymer matrix layer (e.g., during manufacturing). In an illustrative arrangement, guest-host liquid crystal material with surfactant is dispersed into a liquid polymer matrix solution (liquid polymer precursor material for the polymer matrix). High pressure and/or vibration then may be used to break the guest-host liquid crystal material into nanodroplets forming cells 30. After cells 30 have been embedded throughout the matrix in this way, the liquid polymer of the matrix may be cured (e.g., by application of light such as ultraviolet light and/or high temperature), followed by baking to harden the matrix layer.

If desired, a pair of substrates each of which has been coated with a polymer matrix with embedded guest-host liquid crystal cells 30 may be sandwiched together to form an adjustable light transmission layer. Consider, as an example, the scenarios illustrated in FIGS. 4 and 5.

Figure 4:
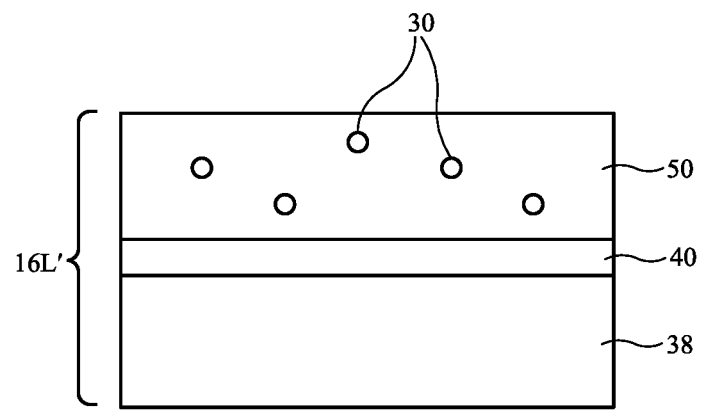
FIG. 4 is a cross-sectional side view of part of an illustrative adjustable transmission window layer in accordance with an embodiment.

Initially, as shown in FIG. 4, substrate layer 38 may be covered with a transparent conductive electrode layer such as electrode 40. Substrate layer 38 may be formed from a rigid or flexible polymer film (e.g., a polyethylene terephthalate, cyclic olefin polymer, cellulose triacetate, polycarbonate, or other polymer materials). These materials and/or other polymers may also be used in forming polymer matrix 50. The thickness of substrate layer 38 may be, as an example, at least 1 micron, at least 10 microns, at least 100 microns, less than 3 mm, less than 500 microns, less than 150 microns, less than 30 microns, or other suitable thickness. Electrode 40 may be formed from a transparent conductive layer such as a layer of indium tin oxide, a transparent conductive polymer such as poly(3,4-ethylenedioxythiophene) (PEDOT), or other transparent conductive layer. The thickness of electrode 40 may be, for example, at least 0.1 micron, at least 1 micron, at least 10 microns, less than 100 microns, less than 20 microns, less than 2 microns, or other suitable thickness.

Polymer matrix 50 and embedded guest-host liquid crystal cells 30 may be formed by depositing liquid polymer precursor material for matrix 50 that contains guest-host liquid crystal material onto electrode 40 followed by application of pressure and/or vibrations to form cells 30. The thickness of the layer of matrix 50 that is formed on electrode 40 may be 4-10 microns (e.g., about 6 microns), at least 1 micron, at least 2 microns, at least 4 microns, less than 30 microns, less than 15 microns, less than 9 microns, or other suitable thickness).

Figure 5:
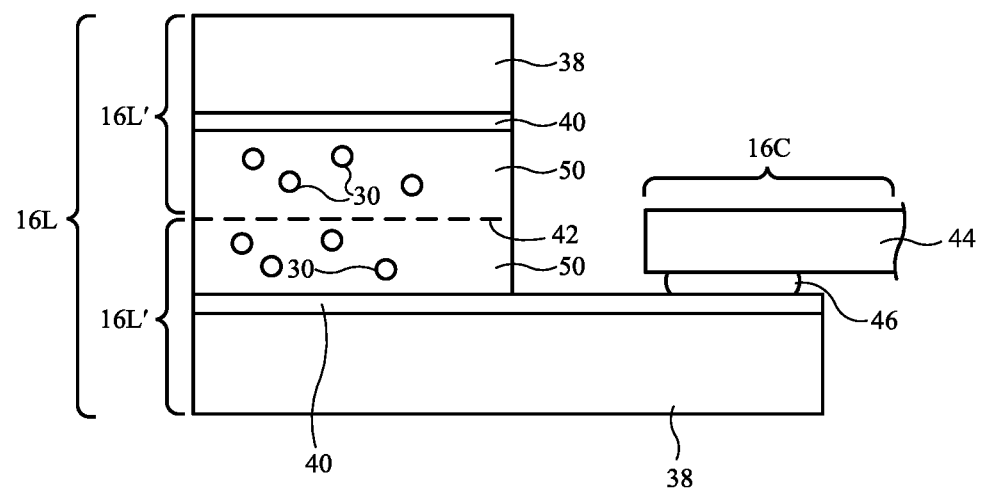
FIG. 5 is a cross-sectional side view of an adjustable transmission window layer in accordance with an embodiment.

After curing matrix 50 and thereby forming partial layer 16L' of FIG. 4, a pair of these layers (with layers of matrix 50 facing each other) may be attached to each other along bond line 42 to form an adjusted transmission window layer 16L of the type shown in FIG. 5. The thickness of the layer of matrix 50 that is formed by joining the two matrix layers of FIG. 5 along bond line 42 may be 8-20 microns, about 12 microns, at least 3 microns, at least 5 microns, at least 10 microns, less than 30 microns, less than 20 microns, less than 10 microns, or other suitable thickness.

Bonding along bond line 42 may be performed by pressing upper and lower layers of polymer matrix 50 together under heat and/or pressure and or may involve attaching these layers of polymer matrix 50 using an optional interposed layer adhesive (e.g., a layer of clear liquid adhesive may be used to bond layers 16L' along bond line 42 of FIG. 5). As shown in FIG. 5, edge portion 16C of layer 16L may have a protruding portion of substrate 38 and an associated electrode 40 to provide a contact (e.g., adjustable layer terminal). This contact may be coupled to a signal line such as signal line 44 (e.g. a wire, a metal foil, a printed circuit with metal traces, etc.) using conductive material 46 (e.g., solder, conductive adhesive, etc.).

Following formation of window 16, window 16 may be installed in a window opening in support structure 12 or other portion of system 10.

The foregoing is merely illustrative and various modifications can be made to the described embodiments. The foregoing embodiments may be implemented individually or in any combination.

What is claimed is:

1. A vehicle window configured to separate an interior region from an exterior region, comprising:
   a first structural window layer;
   a second structural window layer; and
   an adjustable transmission layer between the first and second structural window layers, wherein the adjustable transmission layer comprises a layer of polymer matrix with embedded guest-host liquid crystal nanosized cells droplets, and wherein each of the embedded guest-host liquid crystal nanosized droplets contains liquid crystal and guest dye molecules.

2. The window defined in claim 1 wherein the adjustable transmission layer comprises first and second transparent conductive electrodes on opposing first and second sides of the layer of polymer matrix.

3. The window defined in claim 2 wherein the embedded guest-host liquid crystal nanosized droplets have diameters of less than 200 nm.

4. The window defined in claim 2 wherein the layer of polymer matrix has a first refractive index, wherein the embedded guest-host liquid crystal nanosized droplets have a second refractive index, and wherein the first and second refractive indices differ by less than 0.1.

5. The window defined in claim 2 wherein the layer of polymer matrix has a thickness of 8 to 20 microns.

6. The window defined in claim 2 wherein the first and second transparent conductive electrodes comprise a material selected from the group consisting of: indium tin oxide and conductive polymer.

7. The window defined in claim 2 further comprising a first transparent substrate on which the first electrode is formed and a second transparent substrate on which the second electrode is formed.

8. The window defined in claim 7 wherein the first and second transparent substrates comprise respective first and second polymer films.

9. The window defined in claim 8 wherein the first and second transparent substrates have curved cross-sectional profiles.

10. The window defined in claim 9 wherein the first and second structural window layers comprise first and second respective glass layers.

11. The window defined in claim 2 wherein the adjustable transmission layer is configured to exhibit a clear state with a transmission of at least 30% when a first alternating current signal is applied across the first and second electrodes and is configured to exhibit a dark state with a transmission of less than 10% when a second alternating current signal is applied across the first and second electrodes.

12. The window defined in claim 11 wherein the second voltage is less than the first voltage.

13. The window defined in claim 1 wherein the first structural window layer comprises a laminated layer having a pair of glass layers with an interposed layer of polymer.

14. The window defined in claim 1 wherein the guest-host liquid crystal nanosized cells droplets exhibit a clearing temperature of at least 100° C.

15. The window defined in claim 1 wherein the guest dye molecules comprise dichroic dye and wherein the liquid crystal exhibits a birefringence of less than 0.08.

16. The window defined in claim 1 wherein the guest dye molecules comprise dichroic dye, and wherein the adjustable transmission layer is configured to adjust in response to an alternating-current drive signal.

17. A system, comprising:
a body structure;
a window mounted in the body structure that separates an interior region from an exterior region, wherein the window comprises an adjustable light transmission layer having opposing first and second conductive electrode layers and having a layer of polymer with embedded guest-host liquid crystal nanosized droplets between the first and second conductive electrode layers, and wherein each of the embedded guest-host liquid crystal nanosized droplets contains liquid crystal and guest dye molecules;
input-output circuitry configured to receive a command; and
control circuitry configured to adjust light transmission through the window by adjusting an alternating-current drive signal applied by the first and second conductive electrode layers to the layer of polymer with the embedded guest-host liquid crystal nanosized droplets.

18. The system defined in claim 17 wherein the control circuitry is configured to adjust the window between a clear state in which the adjustable light transmission layer exhibits a transmission of at least 30% and a haze of less than 5% and a dark state in which the adjustable light transmission layer exhibits a transmission of less than 10%.

19. The system defined in claim 18 wherein the control circuitry is configured to apply a first alternating-current signal in the clear state and a second alternating-current signal in the dark state and wherein the control circuitry is configured to change from the first alternating-current signal to the second alternating-current signal in a minimum of 10 ms.

20. A system, comprising:
a support structure;
a glass layer with a curved cross-sectional profile in the support structure; and
an adjustable light transmission layer on the curved glass layer, wherein the adjustable light transmission layer comprises first and second transparent conductive electrode layers, a polymer matrix layer between the first and second transparent conductive electrode layers, and guest-host liquid crystal nanosized droplets embedded in the polymer matrix layer, wherein the guest-host liquid crystal nanosized droplets each comprise liquid crystal material and dichroic dye.

21. The system defined in claim 20 further comprising:
a first polymer film on which the first transparent conductive electrode layer is formed; and
a second polymer film on which the second transparent conductive electrode layer is formed.

22. The system defined in claim 21 wherein the polymer matrix layer comprises a first polymer matrix sublayer, a second polymer matrix sublayer, and a layer of adhesive configured to bond the first and second polymer matrix sublayers.

* * * * *

UNITED STATES PATENT AND TRADEMARK OFFICE
CERTIFICATE OF CORRECTION

| | |
|---|---|
| PATENT NO. | : 12,090,821 B1 |
| APPLICATION NO. | : 17/364209 |
| DATED | : September 17, 2024 |
| INVENTOR(S) | : Yuan Chen et al. |

It is certified that error appears in the above-identified patent and that said Letters Patent is hereby corrected as shown below:

In the Claims

Column 6, Line 22, "A vehicle window" should read -- A window --

Column 6, Lines 29-30, "nanosized cells droplets" should read -- nanosized droplets --

Column 7, Line 10, "nanosized cells droplets" should read -- nanosized droplets --

Signed and Sealed this
Fifth Day of November, 2024

Katherine Kelly Vidal
*Director of the United States Patent and Trademark Office*